United States Patent
Bender

(10) Patent No.: US 9,428,152 B2
(45) Date of Patent: Aug. 30, 2016

(54) UPGRADEABLE WINDSHIELD ASSEMBLY

(71) Applicant: Taylor Made Group, LLC, Gloversville, NY (US)

(72) Inventor: Thomas J. Bender, Fort Wayne, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 36 days.

(21) Appl. No.: 14/477,913

(22) Filed: Sep. 5, 2014

(65) Prior Publication Data

US 2016/0068137 A1 Mar. 10, 2016

(51) Int. Cl.
*B60S 1/40* (2006.01)
*B60S 1/38* (2006.01)
*B60S 1/04* (2006.01)
*B60J 1/00* (2006.01)

(52) U.S. Cl.
CPC .............. *B60S 1/0438* (2013.01); *B60J 1/008* (2013.01)

(58) Field of Classification Search
CPC .......... B60S 1/02; B60S 1/04; B60S 1/0497; B60S 1/3406; B60S 1/522; B60S 1/0438; B60S 1/166; B60S 1/26; B60S 1/34; B60S 1/4003; B60S 1/4074; B60S 2001/4051; B63B 17/02; B63B 19/02
USPC ........... 296/145, 96.15, 96.17; 426/549, 553, 426/601, 606, 653; 15/250.32, 250.08, 15/250.61, 250.29
See application file for complete search history.

(56) References Cited

U.S. PATENT DOCUMENTS

| | | | | |
|---|---|---|---|---|
| 3,688,334 A | * | 9/1972 | Peterson | B60S 1/3409 15/250.21 |
| 4,118,825 A | | 10/1978 | Hoebrechts et al. | |
| 4,415,196 A | * | 11/1983 | Baum | B60J 1/1884 15/250.3 |
| 5,881,428 A | * | 3/1999 | Simmons | B60S 1/3803 15/250.04 |
| 5,986,351 A | * | 11/1999 | Sauerbrey | B60S 1/583 292/DIG. 43 |
| 5,999,134 A | * | 12/1999 | Dishart | B32B 17/10036 343/713 |
| 6,324,719 B1 | | 12/2001 | Ritacco | |
| 6,557,205 B2 | * | 5/2003 | Ishikawa | B60S 1/26 15/250.13 |
| 7,032,533 B2 | | 4/2006 | Weind | |
| 7,814,611 B2 | * | 10/2010 | Heinrich | B60S 1/3867 15/250.201 |
| 8,201,516 B2 | | 6/2012 | Daniels | |
| 2011/0078868 A1 | * | 4/2011 | Wegner | B60S 1/0436 15/250.31 |
| 2012/0124766 A1 | * | 5/2012 | Antonich | B60S 1/0466 15/250.3 |

\* cited by examiner

*Primary Examiner* — Glenn Dayoan
*Assistant Examiner* — Sunsurraye Westbrook
(74) *Attorney, Agent, or Firm* — Nixon & Vanderhye P.C.

(57) ABSTRACT

A windshield includes a notch formed along an edge, and a motor pocket secured adjacent the notch. The motor pocket includes assembly components for securing a windshield accessory, such as a windshield wiper system. A pocket lid is secured to the motor pocket such that the notch is covered for use without the windshield accessory. The assembly facilitates installation of the windshield accessory if desired.

19 Claims, 3 Drawing Sheets

UPGRADEABLE WINDSHIELD ASSEMBLY

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to windshields and, more particularly, to windshields that are readily upgradeable to include a windshield accessory such as a wiper system.

Off-road vehicles frequently are outfitted with cab enclosure systems, which usually include windshields, side doors, roofs, and rear windows. The windshields may or may not include a windshield wiper system. In order to add a windshield wiper system to an existing vehicle without one, however, it is typically necessary to replace the windshield entirely.

Additionally, often during the design of the vehicle, no thought is given to wiper motor placement, and little or no space is left for the wiper motor.

BRIEF SUMMARY OF THE INVENTION

The preferred embodiments according to the present invention allow for the upgrading of a windshield from a non-wiper windshield to a windshield with a wiper system, without requiring the purchase of a completely new windshield. The windshield is provided with a notch for receiving a wiper motor mount. An insert including a motor pocket is installed over the notch for use without a wiper assembly. The insert enables the windshield to be upgraded to include the wiper assembly or some other windshield accessory. The motor pocket requires very little interior room for placing a wiper assembly motor (it allows the motor to be mounted, in effect, partially on the outside of the windshield), while the wiper assembly is still protected from the elements via an injection molded outer cover and sealant.

In an exemplary embodiment, an upgradeable windshield assembly includes a windshield including a notch along an edge, and a motor pocket secured to one side of the windshield adjacent the notch. The motor pocket includes assembly components for securing a wiper assembly. A pocket lid may be secured to the motor pocket. The pocket lid conceals the assembly components. The motor pocket and the pocket lid may be sized to cover the notch in the windshield. The motor pocket may be bonded to the windshield. The pocket lid may be secured to the motor pocket with screws. The assembly components may include a detachable shaft protrusion positioned in the motor pocket, where a space created by detaching the shaft protrusion may be sized for receiving parts of the wiper assembly. In this context, the shaft protrusion may be configured to be used as a shaft for the wiper assembly. The assembly components may include a plurality of removable blanks for accommodating parts of the wiper assembly. A sealant may be disposed between the motor pocket and the pocket lid. In this context, the motor pocket and the pocket lid may be engaged by a slot connection including a slot and a flange, where the sealant may be disposed in the slot.

In another exemplary embodiment, a windshield includes a notch formed along an edge; a motor pocket secured adjacent the notch, the motor pocket including assembly components for securing a windshield accessory; and a pocket lid secured to the motor pocket.

In yet another exemplary embodiment, a method of assembling a windshield assembly includes the steps of providing a windshield with a notch along an edge; securing a motor pocket to one side of the windshield adjacent the notch, the motor pocket including assembly components for securing a wiper assembly; and securing a pocket lid to the motor pocket, the pocket lid concealing the assembly components.

BRIEF DESCRIPTION OF THE DRAWINGS

These and other aspects and advantages will be described in detail with reference to the accompanying drawings, in which.

DETAILED DESCRIPTION OF THE INVENTION

The windshield assembly according to preferred embodiments is upgradeable such that a windshield without a windshield accessory such as a wiper assembly can be readily upgraded to a windshield including such an accessory. With reference to the drawings, the windshield assembly includes a windshield 10 provided with a notch 12 along a top edge. The windshield 10 may be formed of any suitable material, and in an exemplary embodiment, the windshield is made of laminated glass. The notch 12 is formed during production of the windshield 10.

Figure 1:
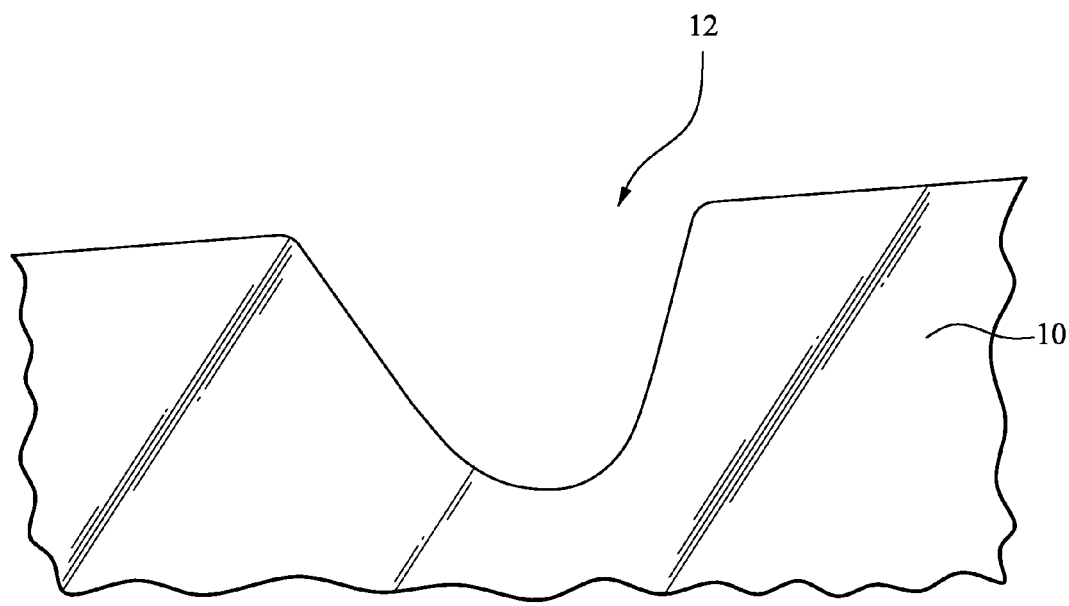
FIG. 1 shows an exemplary geometry of the notch formed in the windshield.
Figure 2:
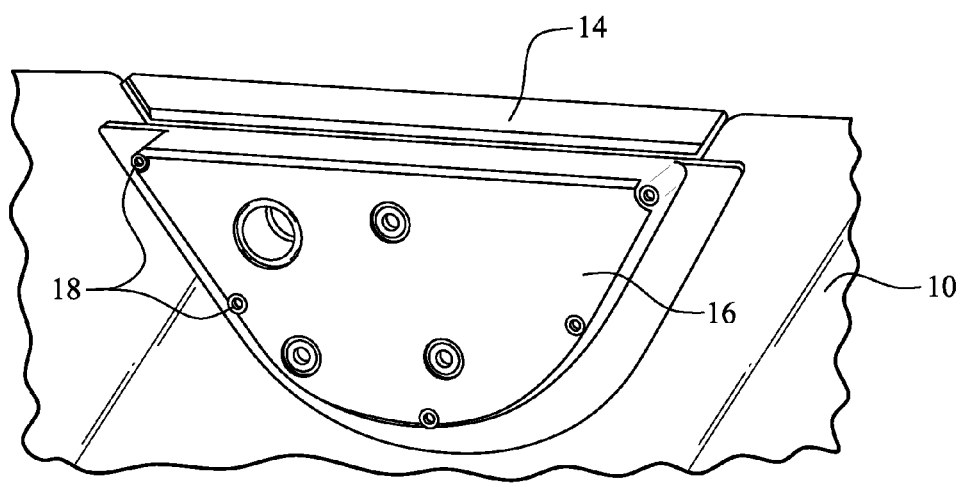
FIG. 2 is a rear view of the assembly.
Figure 3:
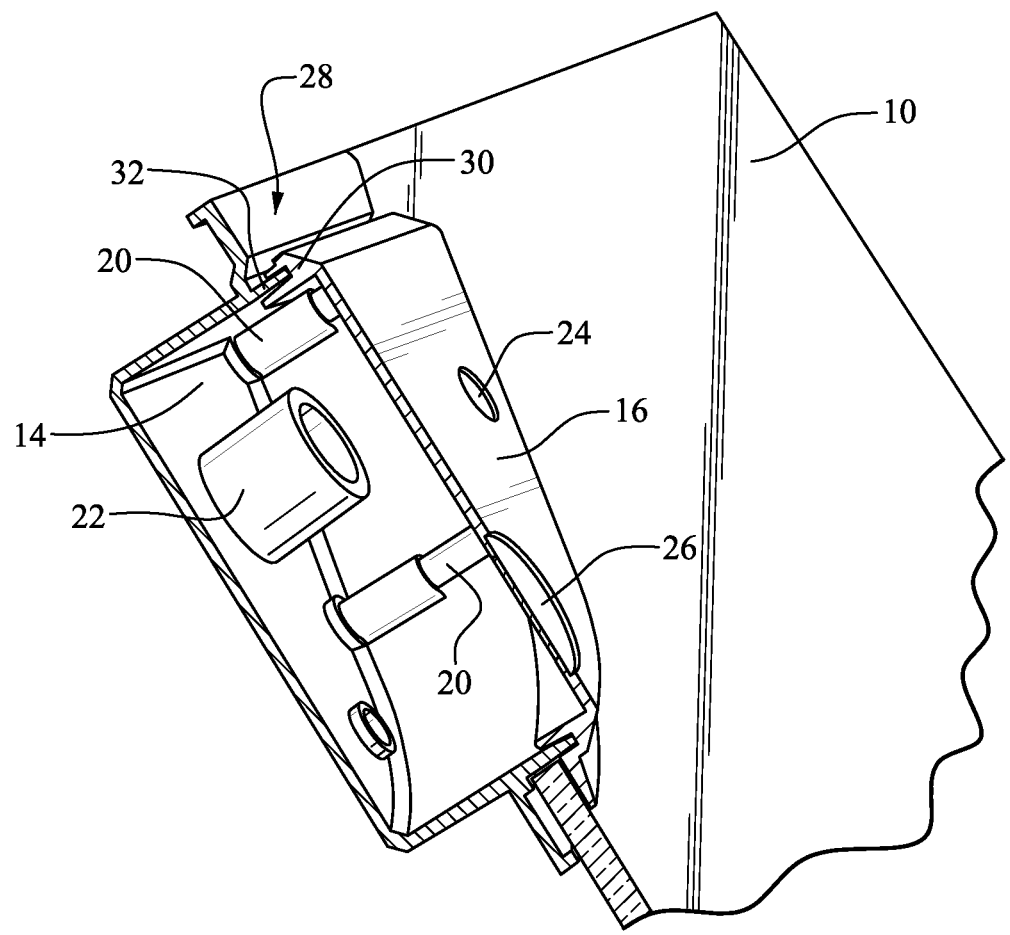
FIG. 3 is a sectional view of the assembly.

As shown in FIGS. 2 and 3, a motor pocket 14 is secured to one side of the windshield 10 adjacent the notch 12. Preferably, the motor pocket 14 is formed of plastic and is bonded to a rear side of the windshield 10. The motor pocket 14 includes assembly components (described below) for securing a windshield accessory such as a wiper assembly. A pocket lid 16 is secured to the motor pocket 14 and conceals the assembly components. Preferably, the pocket lid 16 is also formed of plastic and secured with screws 18 or other suitable connectors through the pocket lid 16. As shown in FIG. 3, the motor pocket 14 includes channels 20 for receiving the screws 18. As shown, the motor pocket 14 and the pocket lid 16 are generally sized to cover the notch 12 in the windshield 10.

Figure 4:
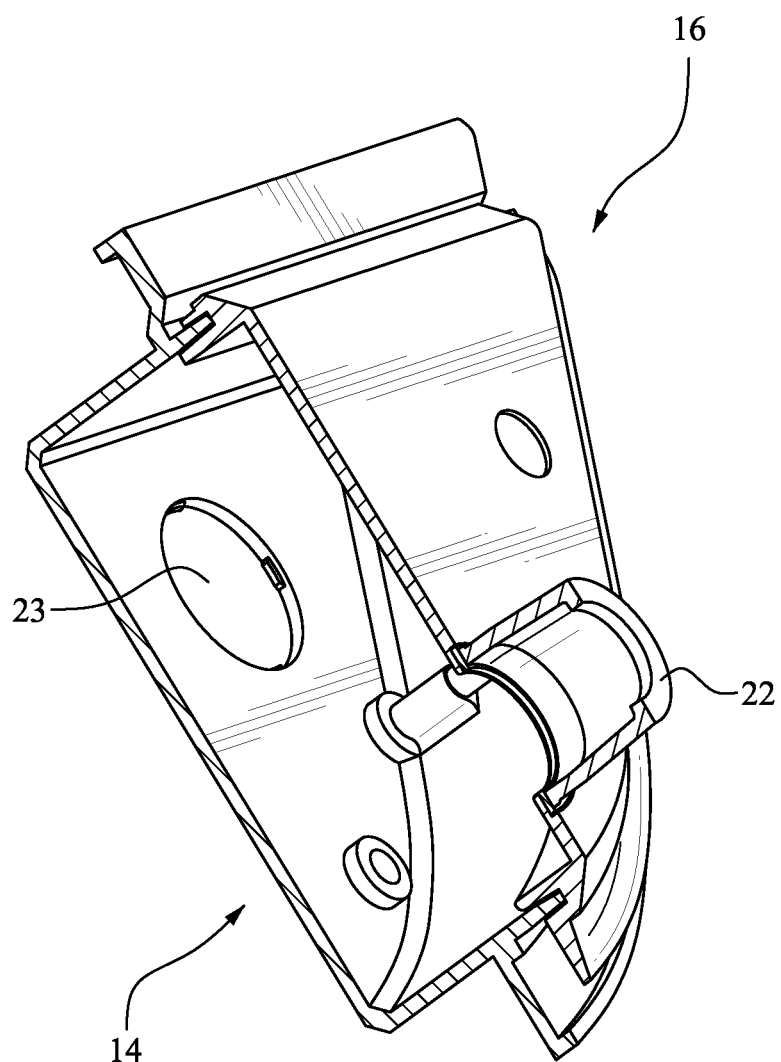
FIG. 4 is a sectional view similar to FIG. 3 with the shaft protrusion detached repositioned.

The assembly components in the motor pocket 14 include a detachable shaft protrusion 22. Once detached, with reference to FIG. 4, a space 23 is created in the motor pocket 14 for receiving wires and other parts including washer fluid tubing and/or a spray nozzle for an accessory component, such as a wiper assembly motor. The pocket lid 16 may include removable blanks 24, 26 for connections and parts of the accessory component. In use, the shaft protrusion 22 is configured to be used as a shaft for the wiper assembly. Preferably, the detached shaft protrusion 22 is positioned in or adjacent the space created by removing the larger blank 26, and the shaft protrusion 22 is held in place by motor mounting hardware of the accessory component. The shaft protrusion 22 is sized to receive the wiper assembly motor.

A bead of sealant such as silicone or the like may be placed between the pocket lid 16 and the repositioned shaft protrusion 22.

With continued reference to FIG. 3, the motor pocket 14 and the pocket lid 16 may be engaged by a slot connection 28 including a slot 30 and a flange 32. A sealant such as silicone or the like may be provided in the slot 30 between the motor pocket 14 and the pocket lid 16.

The assembly enables a non-wiper windshield to be upgraded to include a wiper assembly or other windshield accessory. A pre-formed notch in the windshield is covered by the plastic parts including the pocket lid and motor pocket, which can readily accommodate a wiper system if desired.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An upgradeable windshield assembly comprising:
   a windshield including a notch in the windshield along an edge of the windshield;
   a motor pocket secured to the windshield on one side of the windshield adjacent the notch, the motor pocket including assembly components for securing a wiper assembly; and
   a pocket lid secured to the motor pocket, the pocket lid concealing the assembly components.

2. An upgradeable windshield according to claim 1, wherein the motor pocket and the pocket lid are sized to cover the notch in the windshield.

3. An upgradeable windshield according to claim 1, wherein the motor pocket is bonded to the windshield.

4. An upgradeable windshield according to claim 1, wherein the pocket lid is secured to the motor pocket with screws.

5. An upgradeable windshield according to claim 1, wherein the assembly components comprise a detachable shaft protrusion positioned in the motor pocket, and wherein a space created by detaching the shaft protrusion is sized for receiving parts of the wiper assembly.

6. An upgradeable windshield according to claim 5, wherein the shaft protrusion is configured to be used as a shaft for the wiper assembly.

7. An upgradeable windshield according to claim 1, wherein the assembly components comprise a plurality of removable blanks for accommodating parts of the wiper assembly.

8. An upgradeable windshield according to claim 1, further comprising a sealant between the motor pocket and the pocket lid.

9. An upgradeable windshield according to claim 8, wherein the motor pocket and the pocket lid are engaged by a slot connection including a slot and a flange, and wherein the sealant is disposed in the slot.

10. An upgradeable windshield according to claim 1, wherein the windshield comprises laminated glass.

11. A windshield comprising:
    a notch in the windshield formed along an edge of the windshield;
    a motor pocket secured to the windshield adjacent the notch, the motor pocket including assembly components for securing a windshield accessory; and
    a pocket lid secured to the motor pocket.

12. A windshield according to claim 11, wherein the motor pocket and the pocket lid are sized to cover the notch.

13. A windshield according to claim 11, wherein the pocket lid is secured to the motor pocket with screws.

14. A windshield according to claim 11, wherein the assembly components comprise a detachable shaft protrusion positioned in the motor pocket, and wherein a space created by detaching the shaft protrusion is sized for receiving a component of the windshield accessory.

15. A windshield according to claim 14, wherein the shaft protrusion is configured to be used as a shaft for the windshield component.

16. A windshield according to claim 11, wherein the assembly components comprise a plurality of removable blanks for accommodating parts of the windshield accessory.

17. A method of assembling a windshield assembly, the method comprising:
    providing a windshield with a notch in the windshield along an edge of the windshield;
    securing a motor pocket to the windshield on one side of the windshield adjacent the notch, the motor pocket including assembly components for securing a wiper assembly; and
    securing a pocket lid to the motor pocket, the pocket lid concealing the assembly components.

18. A method according to claim 17, wherein the assembly components comprise a detachable shaft protrusion positioned in the motor pocket, the method further comprising detaching the shaft protrusion thereby creating a space sized for receiving parts of the wiper assembly.

19. A method according to claim 18, further comprising using the shaft protrusion as a shaft for the wiper assembly.

\* \* \* \* \*